United States Patent [19]
Itoi et al.

[11] Patent Number: 5,485,984
[45] Date of Patent: Jan. 23, 1996

[54] DIAPHRAGM VALVE

[75] Inventors: Shigeru Itoi; Michio Yamaji; Tetsuya Kojima, all of Osaka, Japan

[73] Assignee: Masako Kiyohara, Kumamoto, Japan

[21] Appl. No.: 250,609

[22] Filed: May 27, 1994

[30] Foreign Application Priority Data

Jun. 2, 1993 [JP] Japan .................... 5-131939

[51] Int. Cl.$^6$ .................................. F16K 7/12
[52] U.S. Cl. .......................... 251/331; 251/363
[58] Field of Search ................... 251/331, 363, 251/63.5, 118, 359, 360, 361, 362

[56] References Cited

U.S. PATENT DOCUMENTS

| 4,828,219 | 5/1989 | Ohmi et al. | 251/331 X |
| 5,215,286 | 6/1993 | Kolenc | 251/331 X |
| 5,295,662 | 3/1994 | Yamaji et al. | 251/331 |

FOREIGN PATENT DOCUMENTS

| 3115970 | 5/1988 | Japan | 251/331 |
| 3153974 | 7/1991 | Japan | 251/363 |

*Primary Examiner*—Martin P. Schwadron
*Assistant Examiner*—Kevin L. Lee
*Attorney, Agent, or Firm*—Griffin, Butler, Whisenhunt & Kurtossy

[57] ABSTRACT

A diaphragm valve is provided with a removable metallic elastic seating ring (7) having a first passage (10) and at least one second passage (11) extending through it. The first passage communicates with an inlet passage (8) of the valve while the second passage communicates with the outflow passage (9). A first surface (7a) of the seating ring is provided with a valve seat (12) against which the diaphragm (6) may be pressed to block fluid flow through the valve. A second surface (7b) of the seating ring has two annular and axially extending projections (15, 16). The first projection (15) contacts a bottom surface (2a) of valve chamber (2) in a region surrounding the opening where the inflow passage joins the valve chamber. The second projection (16) contacts the bottom surface of the valve chamber around the periphery of the valve chamber. The first projection extends axially of the seating ring to a slightly greater extent than the second projection so that when a diaphragm holder (5) presses the diaphragm against the periphery of the seating ring, the seating ring flexes thus causing increased contact pressure between the first projection and the bottom surface of the valve chamber. This reduces the possibility of leakage flow between the bottom wall and the seating ring from the inflow passage to the outflow passage.

8 Claims, 6 Drawing Sheets

DIAPHRAGM VALVE

FIELD OF THE INVENTION

The present invention relates to diaphragm valves and more particularly to an improved valve seat arrangement wherein the valve seat is supported on a removable or replaceable seating ring.

BACKGROUND OF THE INVENTION

U.S. Pat. No. 5,295,662 discloses a diaphragm valve wherein a chamber within a valve body is divided by a flexible diaphragm into an operating chamber and a valve chamber. A fluid inlet passage terminates at an inlet opening in the bottom of the valve chamber. A valve seat is recessed within a groove in the bottom wall of the valve chamber and surrounds the inlet opening. A fluid outlet passage terminates at an outlet opening in the bottom wall of the valve chamber in a region outside the valve seat. A diaphragm operating mechanism selectively moves the diaphragm into contact with, or way from, the valve seat to selectively block or permit the flow of fluid from the fluid inlet passage to the fluid outlet passage. Because the valve seat is recessed in a groove in the bottom wall of the chamber, it is difficult to remove and replace in the event it is damaged or becomes worn. Furthermore, the bottom wall in which the valve seat is recessed may be damaged during the removal or replacement process in whch case the valve must be replaced or else the bottom wall machined.

The aforementioned patent also discloses a modified form of a diaphragm valve as described above. In the modified form the valve seat is not a separate element but instead comprises a ring-like projection on the bottom wall of the chamber which cooperates with the diaphragm to selectively block or permit fluid flow through the valve. If the valve seat in a valve of this type is damaged, it must be machined or the valve body replaced.

SUMMARY OF THE INVENTION

An object of the present invention is to provide a diaphragm valve wherein the valve seat is easily removable or replaceable.

Another object of the invention is to provide a diaphragm valve wherein the valve seat is mounted on, or comprises a portion of, a removable valve seating ring.

Yet another object of the invention is to provide a diaphragm valve comprising: a valve body having a chamber, a fluid inlet passage and a fluid outlet passage communicating with the chamber through openings in a wall of the chamber; a diaphragm disposed in the chamber and dividing the chamber into an operating chamber and a valve chamber; a removable seating ring disposed against the wall in the valve chamber, the seating ring having a first passage extending therethrough and communicating with the fluid inlet passage and second passage means communicating with the valve chamber on opposite sides of the seating ring, the valve seating ring having a valve seat disposed thereon and surrounding the first passage on a first surface of the seating ring facing the diaphragm; and, valve operating means for selectively moving the valve into contact with the valve seat to block flow of a fluid from the fluid inlet passage to the valve chamber.

A further object of the invention is to provide a diaphragm valve as described above and further comprising a diaphragm holder for pressing against a first surface of the diaphragm in a peripheral region of the diaphragm, the seating ring having a peripheral projection on its first surface against which the diaphragm is pressed to thereby clamp the diaphragm.

Another object of the invention is to provide a diaphragm valve as described above wherein the seating ring is provided with first and second annular projections on a second surface of the seating ring facing the wall, the first annular projection surrounding the first passage and the second annular projection extending along the periphery of the second surface, the first annular projection extending outwardly from the second surface of the seating ring further than the second annular projection whereby the first annular projection forms a fluid seal with the wall when the diaphragm is pressed against the peripheral projection on the first surface of the seating ring. The first annular projection extends outwardly on the order of 0.5mm further than the second annular. The second annular projection and/or the valve seat may comprise a synthetic resin material disposed in a groove or groves provided on the seating ring. Alternatively, the seating ring and the valve seat, the seating ring and the second annular projection, or the valve seat, seating ring and second annular projection may comprises a monolithic body, preferably made of metal.

Other objects and advantages of the invention and the manner of making and using it will become obvious from the following description and the accompanying drawings.

DESCRIPTION OF THE INVENTION

Figure 1:
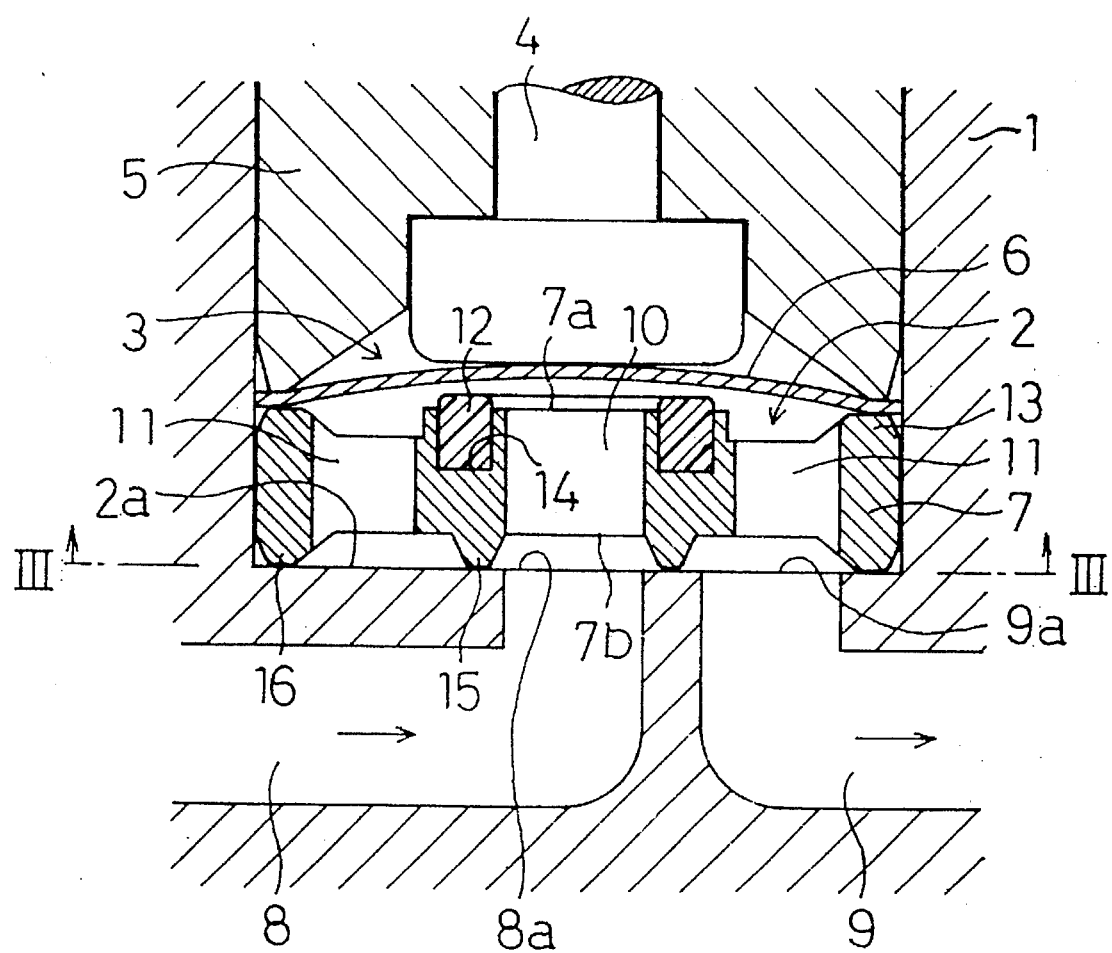
FIG. 1 is a sectional view of a portion of a diaphragm valve, the valve being shown in the open position.
Figure 2:
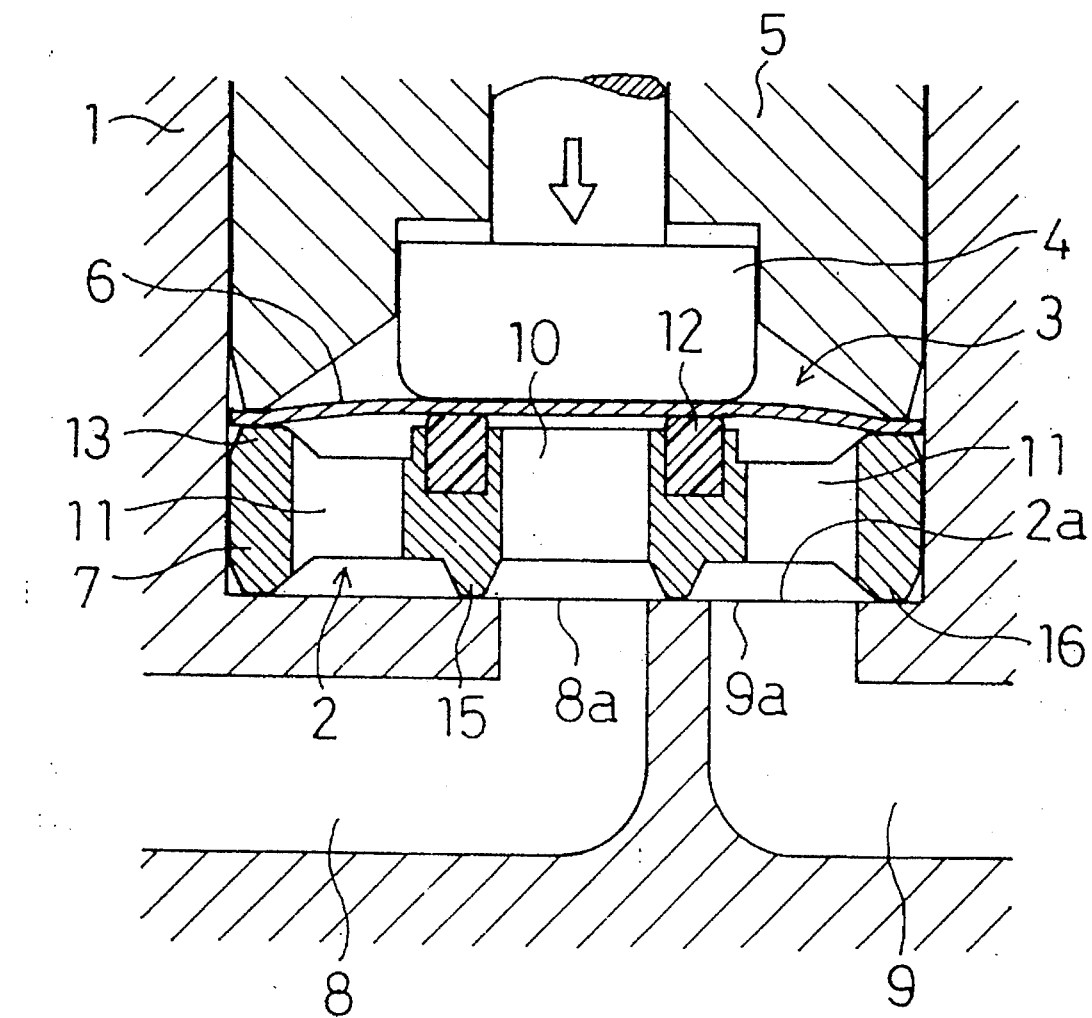
FIG. 2 is a sectional view of a portion of a diaphragm valve, the valve being shown in the closed position.

Referring to FIGS. 1 and 2 a diaphragm valve body 1 is provided with a chamber which is open at the top for receiving the valve components including a thin metal diaphragm 6 which divides the chamber into a valve chamber 2 and a valve operating chamber 3. A metallic valve stem 4, which is part of a valve operating mechanism, is movable axially in a central opening provided in a diaphragm holder 5. As explained in U.S. Pat. No. 5,295,662, the exterior top portion of the valve body 1 is threaded for receiving a clamping nut which presses downwardly on the holder 5 so that the holder may be tightened to press downwardly against the peripheral portion of the diaphragm 6.

In accordance with the present invention, a metallic elastic seating ring 7 is disposed within valve chamber 2 and rests on the bottom wall 2a of the valve chamber. The peripheral portion of diaphragm 6 is clamped between diaphragm holder 5 and seating ring 7 as the clamping nut is screwed onto the valve body so that a fluid tight seal is formed between the valve chamber 2 and the valve operating chamber 3.

As is conventional, the valve body 1 is provided with a fluid inlet passage 8 terminating at an inlet opening 8a in the bottom wall 2a, and a fluid outlet passage 9 terminating at an outlet opening 9a in the same bottom wall.

Figure 3:
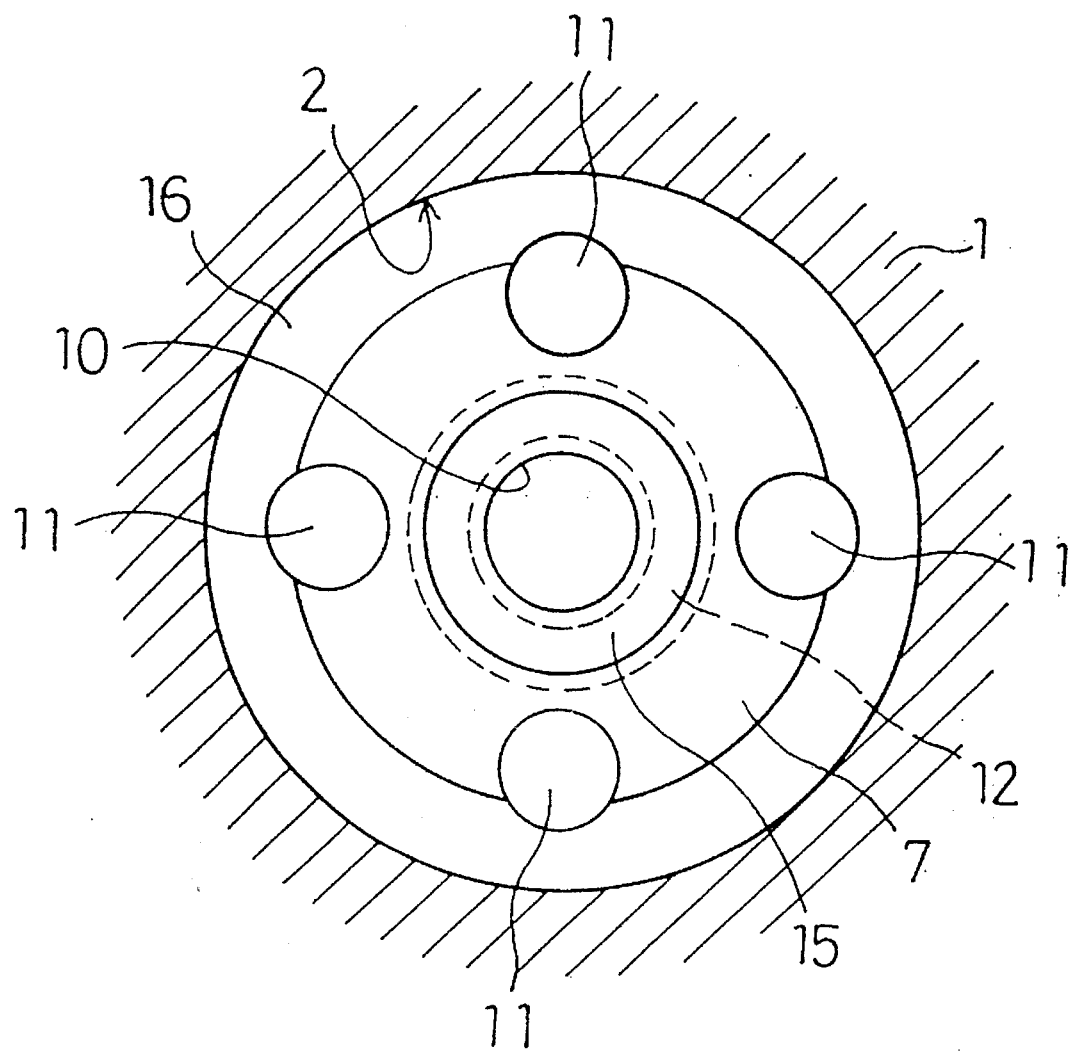
FIG. 3 is a sectional view taken along the line III—III of FIG. 1.
Figure 4:
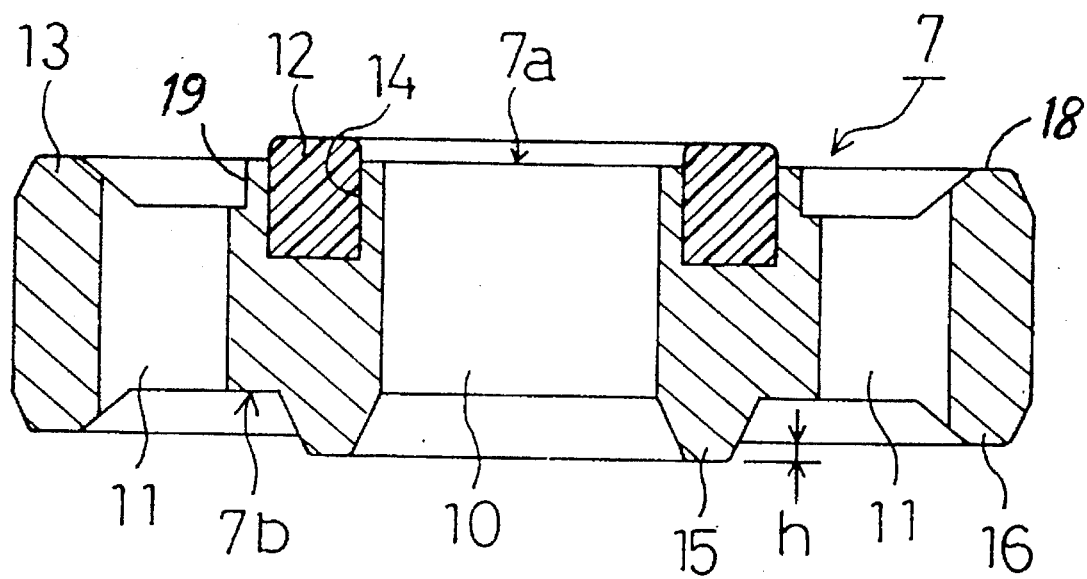
FIG. 4 is a sectional view, on enlarged scale, of a removable seating ring having a valve seat recessed therein.

As shown in FIGS. 3 and 4, the valve seating ring 7 is a circular element having oppositely facing surfaces 7a and 7b, a centrally located first opening or fluid passage 10 and a further passage means comprising at least one but preferably more second openings or passages 11, the passages all extending axially through the seating ring from surface 7a to surface 7b so as to connect the valve chamber on opposite sides of the seating ring. The surface 7a has a circular projection 19 extending outwardly therefrom and surrounding the first passage 10. The surface of circular projection 19 is provided with an annular groove 14 into which a valve seat 12 of synthetic resin material is inserted.

Surface 7a of valve seating ring 7 is provided with a second circular projection 13 which has a flat surface 18 and extends around the peripheral region of the seating ring. The flat surface 18 provides a flat clamping surface against which the diaphragm 6 is pressed as the diaphragm holder 5 presses downwardly (FIG. 1) against the diaphragm.

Surface 7b of valve seating ring 7 is provided with a first annular projection 15 surrounding passage 10 and a second annular projection 16 extending around the peripheral region of the seating ring. The projection 15 extends outwardly from surface 7b by a distance h=0.5mm further than projection 16.

When the valve is assembled, the valve seating ring 7, with the valve seat 12 mounted thereon, is inserted into the valve body 1 after which the diaphragm 6 is placed on top of the valve seating ring. The valve stem 4 and diaphragm holder 5 are then inserted into the valve body 1. As a clamp nut (not shown) is screwed onto the valve body it forces the diaphragm holder downwardly thus applying force to the periphery of diaphragm 6. This force is transmitted to the projection 13 on the seating ring. Since the projection 15 extends downwardly slightly further than projection 16, the projection 15 comes in contact with the bottom wall 2a of the valve chamber before the projection 16 is firmly seated against the wall. Since the seating ring is relatively thin and made of a metal such as stainless steel or the like exhibiting a certain degree of flexibility, it will bend slightly so that projection 16 is forced against bottom wall 2a as the clamping nut is screwed further onto the valve body. At the same time, the bottom surface of projection 15 is forced firmly against the bottom wall 2a so that a fluid-tight seal is formed between projection 15 and the bottom wall 2a of the valve chamber.

When the valve is open (FIG. 1) fluid may flow from fluid inlet passage 8 and through passage 10 in seating ring 7 into the region of valve changer 2 above the seating ring. From this region the fluid may flow through the passages 11 into the annular region bounded by projections 15 and 16, surface 7b of the seating ring, and wall 2a. From this annular region the fluid exits from the valve through fluid outlet passage 9.

The valve is closed (FIG. 2) by operating a valve operating mechanism to move valve stem 4 downwardly thereby flexing the thin metal diaphragm 6 until it is forced into contact with the valve seat 12. This blocks the flow of fluid into the valve chamber 2 through passage 10. The firm contact between projection 15 and bottom wall 2a assures that no leakage of fluid may occur between the projection and the bottom wall in either direction between the inlet opening 8a and the outlet opening 9a.

It will be appreciated that in the event the valve seat 12 must be replaced, the replacement process is easier to carry out compared to prior art valves. The seating ring 7 may be removed from the valve body thus making it easier to remove the worn or damaged valve seat from the recess in the seating ring and easier to insert a new valve seat into the recess. Furthermore, if the seating ring 7 should be damaged it may be easily replaced.

Figure 5:
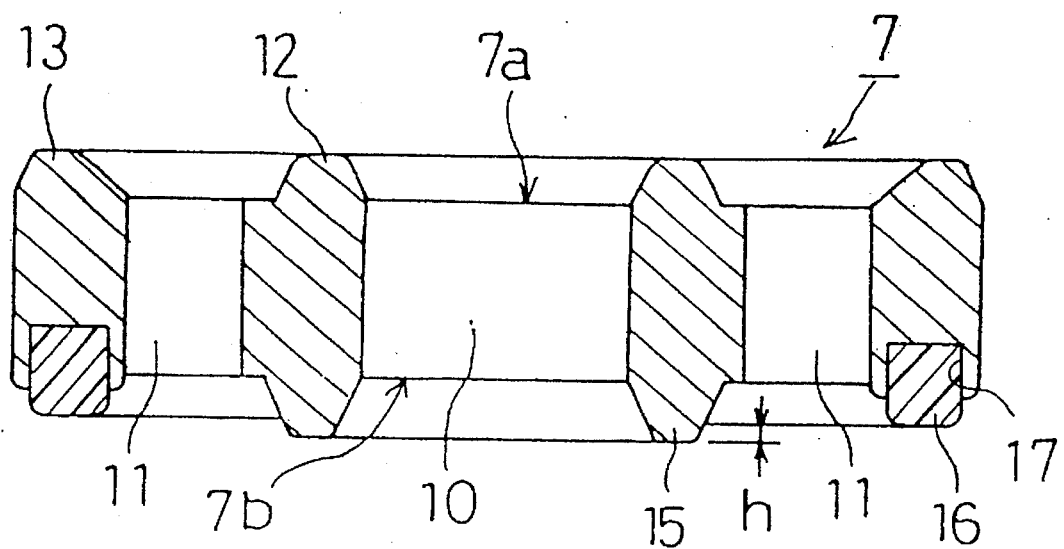
FIG. 5 is a sectional view, on enlarged scale, of a removable seating ring, a portion of which comprises a valve seat; and, FIG. 6 is a sectional view, on enlarged scale, of a monolithic structure comprising a valve seating ring and a valve seat.

Various modifications may be made in the above-described embodiment of the seating ring 7. For example, as shown in FIG. 5, the annular projection 16 need not be monolithically formed with the seating ring 7 but may comprise a ring of synthetic resin material held in an annular groove 17 extending around the periphery of surface 7b. Also, as shown in FIG. 5, the annular projection from surface 7a surrounding passage 10 may itself serve as the valve seat 12. Obviously, a valve seat of synthetic resin material as shown in FIG. 4 may be used with a seating ring having a synthetic resin projection 16.

Figure 6:
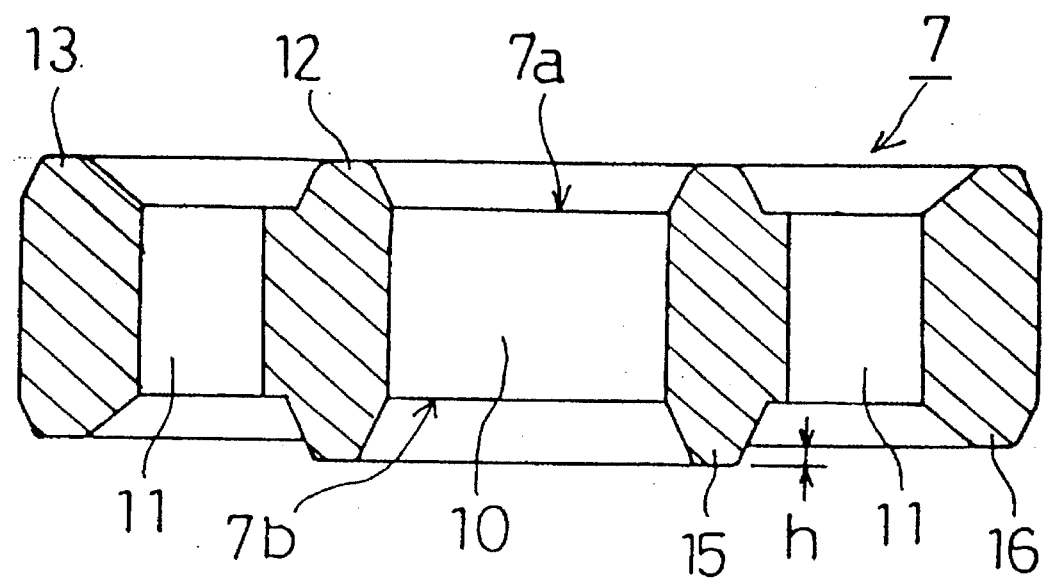

FIG. 6 illustrates a further embodiment wherein the valve seat 12 and seating ring 7 with the projection 16 comprise a monolithic structure.

Other substitutions and modifications may be made in the preferred embodiment without departing from the spirit and scope of the invention as defined in the appended claims.

We claim:

1. A diaphragm valve comprising:

a valve body having a chamber, a fluid inlet passage and a fluid outlet passage communicating with said chamber through openings in a wall of said chamber;

a diaphragm disposed in said chamber and dividing said chamber into an operating chamber and a valve chamber;

a removable elastic seating ring disposed against said wall in said valve chamber, said seating ring having a first passage extending therethrough and communicating with said fluid inlet passage and second passage means communicating with said valve chamber on opposite sides of said seating ring, said seating ring having a valve seat disposed thereon and surrounding said first passage on a first surface of said seating ring facing said diaphragm;

valve operating means for selectively moving said diaphragm into contact with said valve seat to block flow of a fluid from said fluid inlet passage to said valve chamber; and, a diaphragm holder for pressing against a peripheral region of a first surface of said diaphragm, said seating ring having a peripheral projection on its first surface against which said diaphragm is pressed to thereby clamp said diaphragm, said seating ring having first and second annular projections on a second surface of said seating ring facing said wall, said first annular projection surrounding said first passage and said second annular projection extending along the periphery of said second surface, said first annular projection extending outwardly from the second surface of the seating ring further than said second annular projection whereby said first annular projection forms a fluid seal with said wall when said diaphragm is pressed against the peripheral projection on the first surface of the seating ring.

2. A diaphragm valve as claimed in claim 1 wherein said seating ring is provided with a groove and said valve seat comprises a synthetic resin material disposed in said groove.

3. A diaphragm valve as claimed in claim 1 wherein said valve seat and said seating ring comprise a monolithic body.

4. A diaphragm valve as claimed in claim 1 wherein said seating ring is provided with a groove and said second annular projection comprises a synthetic material disposed in said groove.

5. A diaphragm valve as claimed in claim 1 wherein said seating ring and said second annular projection comprise a monolithic body.

6. A diaphragm valve as claimed in claim 1 wherein said seating ring, second annular projection and valve seat comprise a monolithic body.

7. A diaphragm valve as claimed in claim 1 wherein said seating ring comprises an elastic metallic body.

8. A diaphragm valve comprising:

a valve body having a chamber, a fluid inlet passage and a fluid outlet passage communicating with said chamber through openings in a wall of said chamber;

a diaphragm disposed in said chamber and dividing said chamber into an operating chamber and a valve chamber;

a removable elastic seating ring disposed against said wall in said valve chamber, said seating ring having a first passage extending therethrough and communicating with said fluid inlet passage and second passage means communicating with said valve chamber on opposite sides of said seating ring, said seating ring having a valve seat disposed thereon and surrounding said first passage on a first surface of said seating ring facing said diaphragm;

valve operating means for selectively moving said diaphragm into contact with said valve seat to block flow of a fluid from said fluid inlet passage to said valve chamber; and, a diaphragm holder for pressing against a peripheral region of a first surface of said diaphragm said seating ring having a peripheral projection on its first surface against which said diaphragm is pressed to thereby clamp said diaphragm, said seating ring having first and second annular projections on a second surface of said seating ring facing said wall, said first annular projection surrounding said first passage and said second annular protection extending along the periphery of said second surface, said first annular projection extending outwardly from the second surface of the seating ring further than said second annular projection whereby said first annular projection forms a fluid seal with said wall when said diaphragm is pressed against the peripheral projection on the first surface of the seating ring said first annular projection projecting about 0.5 mm further than the second annular projection from the second surface of the seating ring.

* * * * *